(12) United States Patent
Bammesreiter et al.

(10) Patent No.: US 8,184,649 B2
(45) Date of Patent: May 22, 2012

(54) METHOD FOR TRANSMITTING DATA AVAILABLE IN THE FORM OF DATA PACKETS

(75) Inventors: Birgit Bammesreiter, Erding (DE); Wolfgang Entler, Vienna (AT); Klaus Wenninger, Wiener Neustadt (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 810 days.

(21) Appl. No.: 11/666,376

(22) PCT Filed: Aug. 30, 2005

(86) PCT No.: PCT/EP2005/054249
§ 371 (c)(1),
(2), (4) Date: Apr. 26, 2007

(87) PCT Pub. No.: WO2006/045659
PCT Pub. Date: May 4, 2006

(65) Prior Publication Data
US 2007/0263542 A1 Nov. 15, 2007

(30) Foreign Application Priority Data
Oct. 29, 2004 (DE) .......................... 10 2004 052 692

(51) Int. Cl.
*H04L 12/28* (2006.01)
*H04L 12/56* (2006.01)

(52) U.S. Cl. ........................................ 370/412; 370/413

(58) Field of Classification Search .................. 370/412, 370/413
See application file for complete search history.

(56) References Cited

U.S. PATENT DOCUMENTS

| | | | |
|---|---|---|---|
| 6,317,714 B1 * | 11/2001 | Del Castillo et al. | 704/270 |
| 6,650,652 B1 | 11/2003 | Valencia | |
| 6,778,495 B1 | 8/2004 | Blair | |
| 6,801,943 B1 * | 10/2004 | Pavan et al. | 709/226 |
| 6,891,832 B1 * | 5/2005 | Chien et al. | 370/395.1 |
| 6,956,867 B1 * | 10/2005 | Suga | 370/465 |
| 7,317,727 B2 * | 1/2008 | Droz et al. | 370/395.4 |
| 2003/0095567 A1 * | 5/2003 | Lo et al. | 370/466 |
| 2005/0100035 A1 * | 5/2005 | Chiou et al. | 370/412 |
| 2005/0163141 A1 * | 7/2005 | Katayama | 370/412 |
| 2005/0267941 A1 * | 12/2005 | Addante et al. | 709/206 |

FOREIGN PATENT DOCUMENTS

| | | |
|---|---|---|
| EP | 1 202 508 A1 | 5/2002 |
| EP | 1 303 083 A1 | 4/2003 |

* cited by examiner

*Primary Examiner* — Ayaz Sheikh
*Assistant Examiner* — Tarell Hampton

(57) ABSTRACT

In a system in which several data links are available for the transmission while one respective sending unit is allocated to the data links to temporarily store data that is to be transmitted via the respective data link, data packets containing non-real-time critical data are subdivided into fragments of variable sizes prior to forwarding to a sending unit. Data packets containing real time-critical data are preferably forwarded to a sending unit without being fragmented. Additionally, a minimum fragment size can be predefined for the fragmentation process.

20 Claims, 1 Drawing Sheet

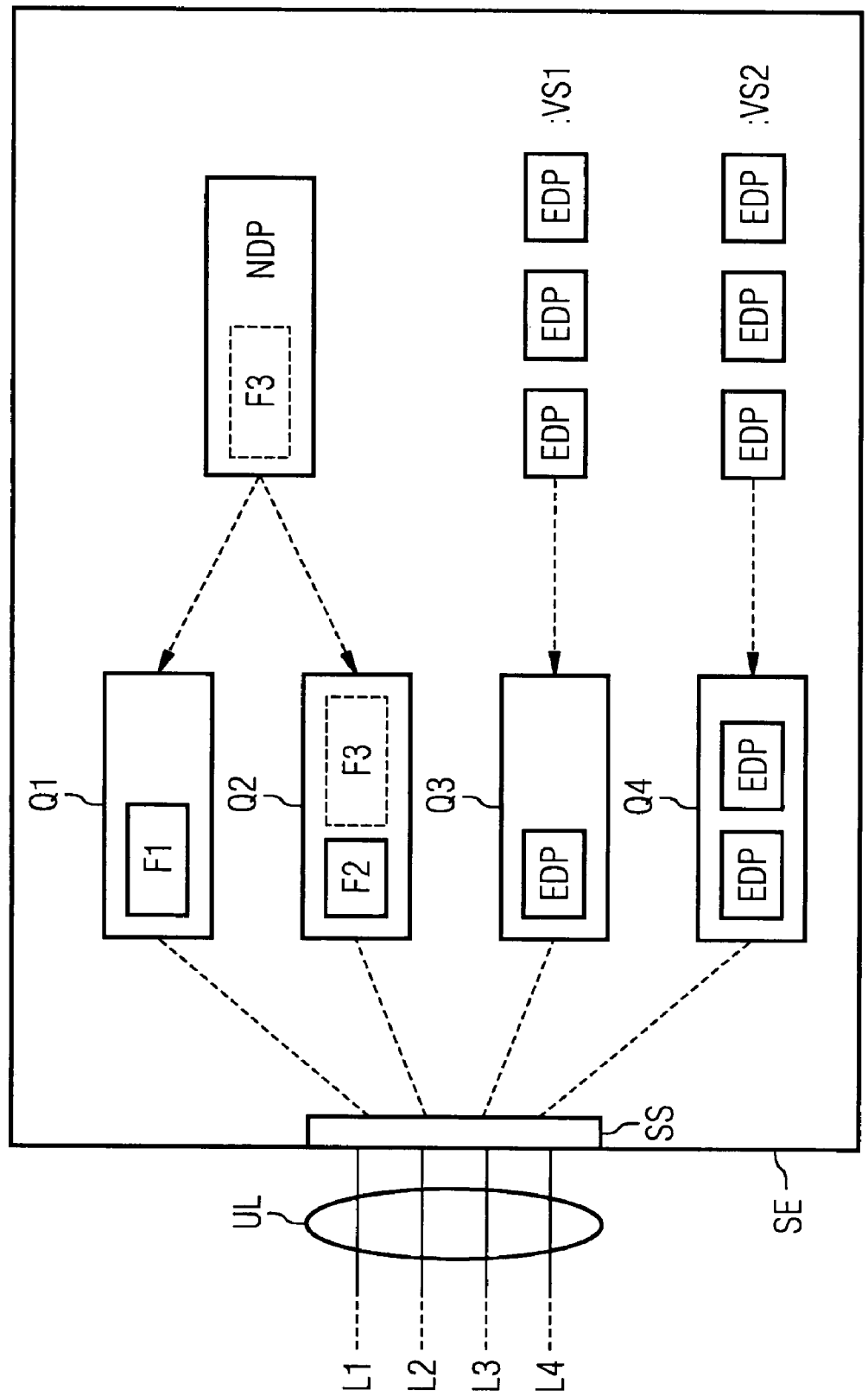

METHOD FOR TRANSMITTING DATA AVAILABLE IN THE FORM OF DATA PACKETS

CROSS REFERENCE TO RELATED APPLICATIONS

This application is the US National Stage of International Application No. PCT/EP2005/054249, filed Aug. 30, 2005 and claims the benefit thereof. The International Application claims the benefits of German application No. 102004052692.3 DE filed Oct. 29, 2004, both of the applications are incorporated by reference herein in their entirety.

FIELD OF INVENTION

The present invention relates to a method for transmitting data that is available in the form of data packets, wherein a plurality of transmission links are available for transmitting and the transmission links have each been assigned a sending unit for buffering data requiring to be transmitted over the respective transmission link.

BACKGROUND OF INVENTION

The data requiring to be transmitted is frequently assigned different service or priority classes so that correct data transmitting—for example within a pre-specified realtime constraint—can be insured. In such a scheme low priority data will then be transmitted over a transmission link only if there is no higher priority data to be transmitted. The consequence thereof in some cases is that low priority data will block a link for a certain period of time because the higher priority data was not yet available for transmission at the time the decision was made about sending the lower priority data.

Particularly in the case of links having a low data transmission rate, for example ISDN (Integrated Services Digital Network) payload data channels or slow uplinks of ADSL (Asymmetrical Digital Subscriber Line) connections, this situation results in unacceptable delays for the higher priority data.

SUMMARY OF INVENTION

A known approach to reducing the delay is to employ a data transmission protocol that makes fragmenting of the data requiring to be transmitted available on the sending side and defragmenting of the transmitted data available on the receiving side. A known protocol that allows fragmenting or, as the case may be, defragmenting of said type is the packet-oriented IP (Internet Protocol) protocol known for transmitting data in computer networks, or the ML-PPP (Multi-Link Point-to-Point Protocol) protocol. The data requiring to be transmitted is therein fragmented prior to sending and only then prioritized on the basis of the fragments. The consequence thereof is that the maximum blocking time will be limited to the duration of transmission of one fragment.

A data packet requiring to be transmitted is therein customarily divided up into as many fragments as there are links available. Although that will cause the delay for each individual data packet to be minimized, fragmenting is often unnecessarily high so that overhead data for fragment management will be generated unnecessarily and management resources consequently occupied unnecessarily. The problem can furthermore arise of not fragmenting highly enough, in particular when only a few links are available, so that the delay will continue exceeding a desired threshold.

U.S. Pat. No. 6,778,495 B1 discloses a method and a device for transmitting data packets wherein "best effort" or, as the case may be, non-realtime-critical data packets are fragmented and transmitted over two communication links. A round-robin technique is provided as the scheduling method for distributing or "balancing" the load in the links.

EP 1 303 083 A1 describes a packet scheduler wherein voice or video data packets are assigned to a premium traffic class and low priority data packets are assigned to a low priority traffic class. A queue is provided in a packet buffer in each case for low priority traffic and for premium traffic and the received data packets are sorted into the respective queue accordingly. The low priority data packets can further be divided in the queue for low priority traffic based on the high priority data packets to be transmitted.

EP 1 202 508 A1 discloses a method and an apparatus for fragmenting NDSI (non-delay sensitive information) wherein the fragmentation is performed based on parameters that are contained in the received DSI (delay sensitive information). The particular parameters are variables such as sample rate, information compression, amount of overhead information, number of channels, etc. NDSI and DSI are transmitted over a single communication link.

An object of the invention is hence to disclose a method and a sending unit by means of both of which it will be possible to achieve data transmitting matched to the prevailing transmission conditions.

Said object is achieved in terms of a method and by a sending unit as described by the independent claims The inventive method is based on a system in which a plurality of transmission links are available for transmitting and the transmission links have each been assigned a sending unit—referred to frequently in the relevant literature as a queue—for buffering data requiring to be transmitted over the respective transmission link.

According to the invention, data packets containing non-realtime-critical data are therein divided up into fragments of variable size before being forwarded to a sending unit and the distribution of the fragments over the transmission links is selected based on an amount of data currently stored in the sending unit and on a data transmission rate that is available on the corresponding transmission link. The data packets containing realtime-critical data are advantageously forwarded to a sending unit with no fragmenting.

A major advantage of the invention is that the inventive method can be implemented in a simple manner in already existing systems and is compatible with existing transmission standards.

Advantageous developments of the invention are described in the dependent claims.

According to an embodiment of the present invention the fragment size and the distribution of the fragments over the transmission links are selected additionally taking into account a settable maximum waiting time between storing of the data into the sending unit and transmitting over the corresponding transmission link. In this case the fragment size is set in such a way that a configurable delay will not be exceeded for the data requiring to be transmitted.

A minimum fragment size can advantageously be specified. In this way unnecessary overhead data for fragment management is prevented in a simple manner in the absence of realtime-critical data requiring to be transmitted.

According to a further embodiment of the present invention realtime-critical data is transmitted only over certain transmission links. That will make it possible to increase the waiting time on the remaining transmission links transmitting the non-realtime-critical data. That will likewise prevent the generation of overhead data for fragment management and hence additionally save processing resources. That will in turn enable less expensive control units (processors) to be used having comparably less processing power.

BRIEF DESCRIPTION OF THE DRAWINGS

An exemplary embodiment of the invention is explained in more detail below with reference to the drawing, in which:

FIG. 1: is a structural schematic of the main functional units involved in the inventive method.

DETAILED DESCRIPTION OF INVENTION

FIG. 1 shows an inventive sending unit SE to which a transmission line ÜL is connected via an interface SS. Said transmission line ÜL comprises a plurality of transmission links, with four transmission links L1, ..., L4 being shown in the present exemplary embodiment. Said transmission links L1, ..., L4 are, for example, ISDN payload data channels— referred to frequently in the relevant literature also as B (bearer) channels—each having a transmission rate of 64 kbits per second. Each transmission link L1, ..., L4 has been assigned a sending unit Q1, ..., Q4 in which data requiring to be transmitted over the corresponding transmission link L1, ..., L4 is buffered. The data buffered in a sending unit Q1, ..., Q4 is scheduled to be transmitted as soon as possible over the corresponding transmission link L1, ..., L4, with transmitting no longer able to be delayed. For better understanding the sending units Q1, ..., Q4 are referred to below— as is customary in the relevant literature—as queues Q1, ..., Q4.

The data requiring to be transmitted over the transmission line ÜL is present in the sending unit SE in the form of data packets. A distinction is herein made between first data packets NDP containing non-realtime-critical data and second data packets EDP containing realtime-critical data. Shown in the present exemplary embodiment are a first data packet NDP and a plurality of second data packets EDP, with three second data packets EDP having been assigned to a first voice connection VS1—referred to frequently in the relevant literature as a voice stream—and three further second data packets EDP having been assigned to a second voice connection VS2.

For transmission over the transmission line ÜL, the first and second data packets NDP, EDP are distributed among the queues Q1, ..., Q4 in accordance with the method described below.

The second data packets EDP of the first voice connection VS1 are buffered in the third queue Q3 before being transmitted over the third transmission link L3. The second data packets EDP of the second voice connection VS2 are buffered in the fourth queue Q4 before being transmitted over the fourth transmission link L4. For transmission over the transmission line ÜL, the first data packet NDP can be buffered in both the first and the second queue Q1, Q2. The first data packet NDP is for this purpose subdivided into fragments F of variable size, with the specific size being dependent on the respective queue Q1, Q2. When the first data packet NDP is being divided up among the queues Q1, Q2, the queue Q1, Q2 appearing most suitable for the next fragment F is chosen therefor. That is as a rule the queue Q1, Q2 having the shortest what is termed "sending queue".

In the present exemplary embodiment a first fragment F1 has already been buffered in the first queue Q1 and a second fragment F2 has already been buffered in the second queue Q2, with the first fragment F1 being larger than the second fragment F2, which is to say the amount of data currently buffered in the first queue Q1 and released for transmission over the first transmission link L1 is larger than the amount of data buffered in the second queue Q2 and released for transmission over the second transmission link L2. As an example, the first fragment F1 is 80 bytes in size and the second fragment F2 is 40 bytes in size.

As already explained above, the transmission links L1, ..., L4 each have a transmission rate of 64 kbits per second. If it is assumed that the maximum delay for a second data packet containing realtime-critical data is 20 ms, then the maximum amount of data requiring to be buffered in a queue Q1, ..., Q4 will be 160 bytes. Said maximum amount of data requiring to be buffered in a queue Q1, ..., Q4 is referred to frequently as the "queue limit". The queue limit is therein dependent on the codecs used for transmission and the necessary transmission quality, etc.

Thus in the present exemplary embodiment a fragment F that is 80 bytes in size could be buffered in the first queue Q1 and a fragment F that is 120 bytes in size could be buffered in the second queue Q2. The second queue Q2 is consequently the more suitable queue for the next fragment F so that a third fragment F3 that is 120 bytes in size will be formed from the first data packet NDP and buffered in the second queue Q2.

Known protocols that allow fragmenting of data packets are the packet-oriented IP (Internet Protocol) protocol for transmitting data in computer networks and the ML-PPP (Multi-Link Point-to-Point Protocol) protocol. If the IP protocol is used, what are termed RTP (Realtime Transport Protocol) data packets are employed as the second data packets EDP. Fragmenting based on the IP protocol will in contrast to fragmenting based on the ML-PPP protocol result in a larger packet header so that processing will be more complex.

Through a fixed assignment to a queue Q3, Q4 of second data packets EDP assigned to a voice connection VS1, VS2, due to the sequence maintained within a voice connection it will on the one hand be possible when the ML-PPP protocol is used to transmit the realtime-critical data without headers so that the fragmenting overhead will be reduced and processing capacity saved and, on the other hand, it will be possible when the IP protocol is used to employ compression techniques that use redundancy in successive headers, in particular in RTP headers.

Queues can furthermore be reserved only for transmitting first data packets NDP. As the queue limit provided for transmitting realtime-critical data does not have to be maintained for said queues, the queue limit can be increased. That will result in a further reduction in the fragmenting overhead and a saving in processing capacity.

The invention claimed is:

1. A method for transmitting data available in the form of data packets comprising:
   providing a plurality of transmission links for transmitting the data;
   providing a plurality of queues;
   assign each of the queues to a respective one of the transmission links for buffering data to be transmitted over the transmission link to which that queue is assigned;
   selecting a fragment size for each fragment of at least one first data packet of non-realtime-critical data for use in dividing the at least one first data packet of non-realtime-critical data into fragments and selecting a distribution of the fragments over the transmission links, wherein the selecting of the fragment size and the selecting of the distribution of the fragments are both based on:
   an amount of data currently stored in each of the queues,
   a data transmission rate available for the transmission link assigned to each of the queues, and taking into account a settable maximum waiting time between storing of the data in the queue and transmitting over the transmission link to which that queue is assigned, and the fragment size for each of the fragments being specific to the queue to which that fragment is to be sent such that a configurable delay for the transmission of the at least one first data packet is not exceeded;

dividing the at least one first data packet into the fragments, the fragments being of variable size; and sending the fragments of the at least one first data packet to the queues to which those fragments are to be sent.

2. The method of claim 1 wherein at least one second data packet of realtime-critical data is forwarded to one of the queues without fragmenting the at least one second data packet.

3. The method of claim 2 wherein the at least one second data packet of realtime-critical data is forwarded to one of the queues without fragmenting the at least one second data packet such that the at least one second data packet is transmitted over a transmission link without headers.

4. The method of claim 1 wherein each of the fragments is selected for distribution so that the fragment is sent to one of the queues such that a shortest transmission delay as available for that fragment is obtained such that the configurable delay for the transmission of the at least one first data packet is not exceeded.

5. The method of claim 1 wherein a minimum fragment size for each of the queues is pre-specified.

6. The method of claim 1 wherein specific ones of the transmission links are reserved for only transmitting realtime-critical data.

7. The method of claim 1 wherein each transmission link has a waiting time and the waiting time is increased for the transmission links over which no realtime-critical data is transmitted.

8. The method of claim 1 wherein the at least one first data packet is embodied according to the IP protocol.

9. The method of claim 2 wherein the at least one second data packet is embodied according to the RTP protocol.

10. The method of claim 2 wherein the at least one first data packet and the at least one second data packet are embodied according to the ML-PPP protocol.

11. An apparatus for transmitting data available in the form of data packets comprising:

a plurality of transmission links for transmitting data;

a plurality of queues, each of the queues assigned to a respective one of the transmission links for buffering data to be transmitted over the transmission link to which that queue is assigned;

the apparatus selecting a fragment size for each fragment of at least one first data packet of non-realtime-critical data for use in dividing the at least one first data packet of non-realtime-critical data into fragments and selecting a distribution of the fragments over the transmission links, wherein the selecting of the fragment size and the selecting of the distribution of the fragments are both based on:

an amount of data currently stored in each of the queues, a data transmission rate available for the transmission link assigned to each of the queues, and taking into account a settable maximum waiting time between storing of the data in the queue and transmitting over the transmission link to which that queue is assigned, and the fragment size for each of the fragments being specific to the queue to which that fragment is to be sent such that a configurable delay for the transmission of the at least one first data packet is not exceeded;

the apparatus dividing the at least one first data packet into the fragments, the fragments being of variable size; and the apparatus sending the fragments of the at least one first data packet to the queues to which those fragments are to be sent.

12. The apparatus of claim 11 wherein at least one second data packet of realtime-critical data is forwarded to one of the queues without fragmenting the at least one second data packet.

13. The apparatus of claim 12 wherein the at least one second data packet of realtime-critical data is forwarded to one of the queues without fragmenting the at least one second data packet such that the at least one second data packet is transmitted over a transmission link without headers.

14. The apparatus of claim 11 wherein each of the fragments is assigned to one of the queues such that a shortest transmission delay as available for that fragment is obtained.

15. The apparatus of claim 11 wherein a minimum fragment size is pre-specified.

16. The apparatus of claim 11 wherein specific transmission links are reserved for only transmitting realtime-critical data.

17. The apparatus of claim 11 wherein each transmission link has a waiting time and the waiting time is increased for the transmission links over which no realtime-critical data is transmitted.

18. The apparatus of claim 11 wherein the at least one first data packet is embodied according to the IP protocol.

19. The apparatus of claim 12 wherein the at least one second data packet is embodied according to the RTP protocol.

20. The apparatus of claim 12 wherein the at least one first data packet and the at least one second data packet are embodied according to the ML-PPP protocol.

* * * * *